United States Patent
Fenech

(10) Patent No.: US 6,932,044 B1
(45) Date of Patent: Aug. 23, 2005

(54) WINDAGE TRAY WITH IMPROVED CAPTURED NUT

(75) Inventor: Chris Fenech, Brownstown, MI (US)

(73) Assignee: General Fasteners Company, Livonia, MI (US)

(*) Notice: Subject to any disclaimer, the term of this patent is extended or adjusted under 35 U.S.C. 154(b) by 19 days.

(21) Appl. No.: 10/787,294

(22) Filed: Feb. 26, 2004

(51) Int. Cl.$^7$ .................. F01M 11/00; F16B 37/04
(52) U.S. Cl. .................. 123/195 C; 123/196 R; 411/183
(58) Field of Search .................. 123/195 C, 195 A, 123/195 S, 196 R; 411/183; 470/21

(56) References Cited

U.S. PATENT DOCUMENTS

| | | |
|---|---|---|
| 175,427 A | 3/1876 | Cobb |
| 2,375,325 A | 5/1945 | Robertson |
| 3,238,581 A | 3/1966 | Sawyer |
| 4,254,809 A | 3/1981 | Schuster |
| 4,362,449 A | 12/1982 | Hlinsky |
| 4,464,091 A | 8/1984 | Molina |
| 4,919,578 A | 4/1990 | Zeigler et al. |
| 4,969,788 A | 11/1990 | Goiny |
| 4,973,208 A | 11/1990 | Gauron |
| 5,006,025 A | 4/1991 | Duran |
| 5,190,423 A | 3/1993 | Ewing |
| 5,203,656 A | 4/1993 | McKinlay |
| 5,314,279 A | 5/1994 | Ewing |
| 5,314,281 A | 5/1994 | Turlach et al. |
| 5,378,099 A | 1/1995 | Gauron |
| 5,393,183 A | 2/1995 | Hinton |
| 5,397,205 A | 3/1995 | Diepeveen |
| 5,423,645 A * | 6/1995 | Muller et al. ............ 411/183 |
| 5,474,409 A | 12/1995 | Terry |
| 5,626,449 A | 5/1997 | McKinlay |
| 5,639,113 A | 6/1997 | Goss et al. |
| 5,688,091 A | 11/1997 | McKinlay |
| 5,752,793 A | 5/1998 | Wu |
| 5,779,409 A | 7/1998 | Manzolli |
| 5,779,418 A | 7/1998 | Ying-Che |
| 5,842,894 A | 12/1998 | Mehlberg |
| 5,868,535 A | 2/1999 | Ladouceur |
| 5,871,402 A | 2/1999 | Bachle |
| 5,904,460 A | 5/1999 | Kawabata |
| 5,924,831 A | 7/1999 | Ricks et al. |
| 5,975,821 A | 11/1999 | Kue |
| 5,984,602 A | 11/1999 | Park |
| 6,024,523 A | 2/2000 | Oudmayer |
| 6,045,309 A | 4/2000 | LeVey |
| 6,158,936 A | 12/2000 | Thommes |
| 6,486,402 B2 | 11/2002 | Harger et al. |
| 6,517,301 B2 | 2/2003 | Hartmann et al. |
| 6,554,552 B2 | 4/2003 | McKinlay |
| 2002/0159857 A1 | 10/2002 | McKinlay |
| 2002/0182031 A1 | 12/2002 | Anderson et al. |
| 2003/0007844 A1 | 1/2003 | Terry |
| 2003/0035699 A1 | 2/2003 | Harris |
| 2003/0039527 A1 | 2/2003 | Schatz |
| 2003/0049092 A1 | 3/2003 | Winker |
| 2003/0077143 A1 | 4/2003 | Smolarek |

* cited by examiner

Primary Examiner—Andrew M. Dolinar
(74) Attorney, Agent, or Firm—Reising, Ethington, Barnes, Kisselle, P.C.

(57) ABSTRACT

A windage tray (26) has a captured nut (30) mounted to a retaining washer (46) through a central aperture (52) that has a tapered interior wall (58) which wholly retains a collar (42) of the captured nut for mounting the tray onto an internal combustion engine (10).

10 Claims, 2 Drawing Sheets

WINDAGE TRAY WITH IMPROVED CAPTURED NUT

TECHNICAL FIELD

The field of this invention relates to a captured threaded nut and to a method of mounting a windage tray in an oil pan under an engine.

BACKGROUND OF THE DISCLOSURE

The internal combustion engine is a highly popular and developed machine. Great strides have been made to make internal combustion engines powerful, reliable, durable, and fuel efficient. One relatively recent development is the introduction of a windage tray that sits above the oil pan and below the crankshaft. The windage tray provides a splash barrier between the oil in the oil pan and the crank shaft. A rapidly rotating crankshaft may be slowed down by excess splash of oil which may rob the engine of horsepower. The windage tray also reduces frothing of the oil by the crank shaft and crank arms to reduce any air intake into the oil pump. Many windage trays are mounted on the underside of the engine block via bolt studs and nuts independent of the oil pan mounting. During engine assembly, the engine block is often in an upside down condition to allow the windage tray to sit in place in proximity to the crankshaft with the nuts then screwed on from above to secure the windage tray.

The use of separate mounting nuts to mount the windage tray on top of the upside down engine at the underside of the engine within the oil pan poses an undesirable risk. During installation, the underside of the engine interior is exposed there is a risk that a loose nut may be dropped into the underside of the engine during installation. If this scenario occurs, the engine may be damaged when it is turned on by the engine with its rapidly moving piston, crank arm and crank shaft banging into the loose nut. Secondly, if after installation, the nut becomes loose and separated from the mounting bolt, the nut most likely will sink to the bottom of the oil pan. However a separated nut can be shaken and again bang into the moving parts in the underside of the engine.

To eliminate the risk of a loose or separated nut, a captured nut can be pre-installed on the windage tray. Captured nuts have been known. While these captured nuts solve the problem of the nut separating from the windage tray, other problems are introduced. The washer is made from a suitable material to withstand the compression between the windage tray and the engine block. The nut however is made from a suitable material to meet both the clamp load and installation requirements. If the washer is thinner than the nut collar, and said collar is crimped over and protrudes beyond the distal face of the washer such that the crimped collar is used as the clamping surface, then the crimped collar as it is torqued into place may break apart and introduce smaller bits of loose metal into the engine interior with the same undesirable result as described above.

Secondly, the small irregular surface area provided by the crimped collar of the nut introduces the potential for clamp load loss following assembly. Those familiar with fastened joint design understand this phenomenon as "relaxation". A smooth flat, and comparatively larger surface of a washer is desired to more accurately obtain and retain a clamp load.

What is needed is an improved captured nut that is mounted on its work piece and more particularly an improved captured nut mounted on a windage tray for an internal combustion engine.

SUMMARY OF THE DISCLOSURE

In accordance with one aspect of the invention, a windage tray assembly for an internal combustion engine includes a plurality of fastener assemblies each with internally threaded fasteners that have a drive section, a first bearing surface, a windage tray receiving step extending from the first bearing surface, a second bearing surface at the end of the step and a washer receiving collar extending from the second bearing surface and being coaxial with the step. A windage tray has a plurality of apertures to receive a respective step and abut or seat against a respective first bearing surface of each fastener. Each fastener has its drive section on one side of the windage tray and the collar on the opposing side of the windage tray. The windage tray about its apertures has a thickness less than the height of the step.

A washer has an aperture therethrough for receiving the collar. The washer has a proximate face abutting against or seating on the second bearing surface and a distal face. The washer has a thickness greater than the height of the collar. The washer has an interior facing wall about its aperture that has a radially extending section that is captured by the collar as it is deformed outwardly with the proximate face seated on the second bearing surface.

In one embodiment, the interior facing wall is tapered radially outwardly from the proximate face to the distal face of the washer. The collar of the fastener is swaged at an angle to abut against the tapered interior facing wall. Preferably, the interior facing wall is angled approximately 70° from the proximate face of the washer.

In another embodiment, the interior facing wall has a radially extending ledge section interposed between the proximate and distal faces of the washer and facing toward the distal face. The collar is crimped over the ledge and lies completely within the axial extent of the washer aperture.

In another embodiment, the interior facing wall of the washer has a circumferential groove therein. The collar is deformed to intrude into the groove and retain the washer axially in place.

In accordance with another aspect of the invention, a captured nut and work-piece assembly includes an internally threaded fastener having a drive section, a first bearing surface, a work-piece receiving step extending from the first bearing surface, a second bearing surface at the end of the step and a washer receiving collar extending from the second bearing surface and being coaxial with the step. The work-piece has an aperture to receive the step and abut or seat against the first bearing surface. The fastener has its drive section on one side of the work-piece and the collar on the opposing side of the work-piece. The work-piece about the aperture has a thickness less than the height of the step.

In this fashion a captured nut is attached to a windage tray for an internal combustion engine or other work-piece and provides a smooth washer face for accurately obtaining and retaining a clamp load and preventing separate or loose nuts in an interior of an internal combustion engine.

BRIEF DESCRIPTION OF THE DRAWINGS

Reference now is made to the accompanying drawings in which.

DETAILED DESCRIPTION OF THE PREFERRED EMBODIMENT

Figure 1:
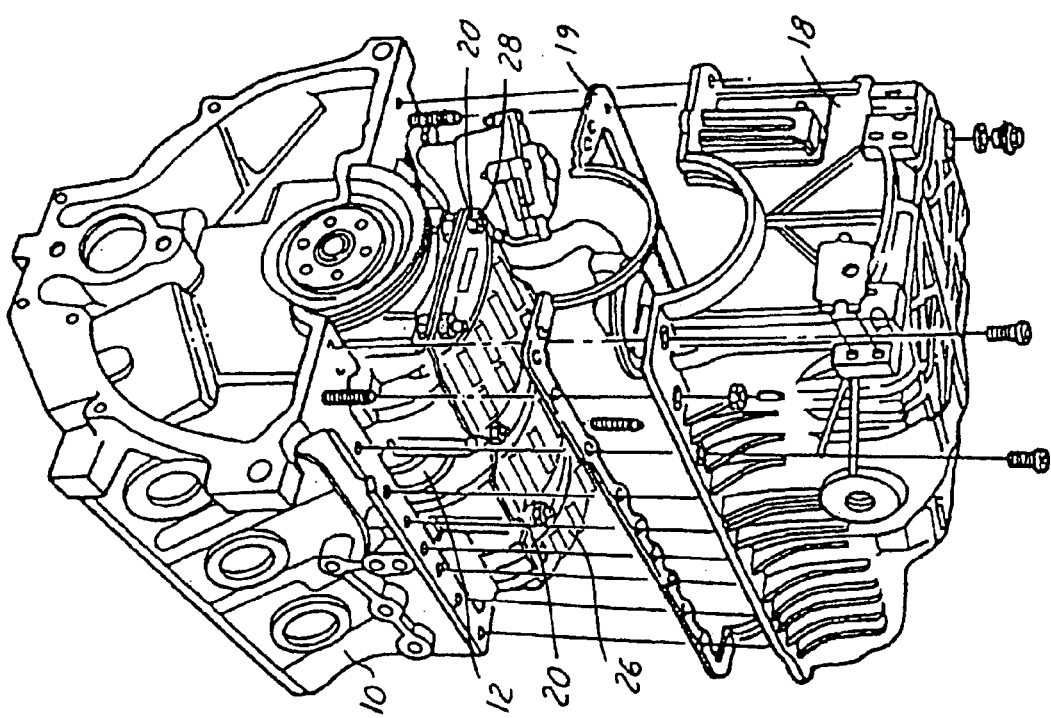
FIG. 1 is a view of an internal combustion engine with an installed windage try in accordance with one embodiment of the invention.
Figure 2:
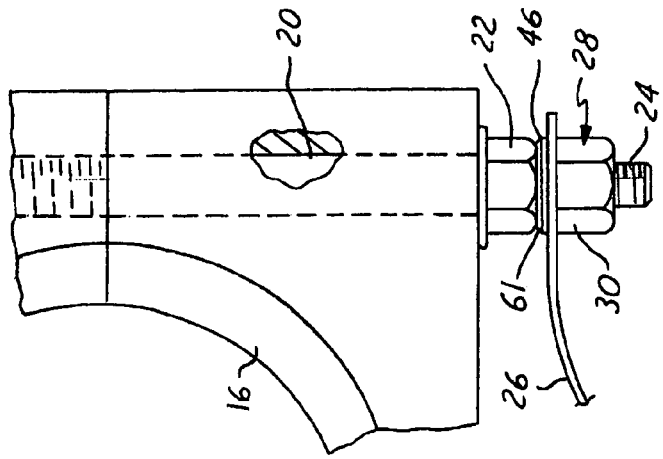
FIG. 2 is an enlarged fragmentary side elevational view more clearly showing the windage tray assembled in place below the crankshaft bearing.

Referring now to FIGS. 1 and 2, an internal combustion engine 10 has conventional crank arms 12 mounted to a rotatable crankshaft 14, which is retained by crank main bearings 16 to the underside of the engine 10. An oil pan 18 is mounted to the underside of the engine which retains the oil therein. Gasket 19 prevents leakage from the oil pan. The crank shaft bearing 16 as more clearly shown in FIG. 2 are mounted to the engine by a plurality of studs 20 that have an integral hex shaped head 22 that also has an externally threaded distal end 24. A plurality of fastener assemblies 28 mount the windage tray 26 in place onto distal ends 24 of studs 20 under the engine and above the oil pan.

Figure 3:
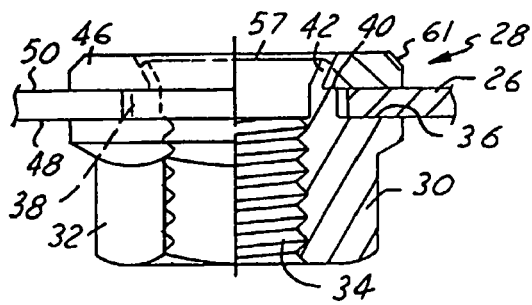
FIG. 3 is an enlarged fragmentary side segmented view of the windage tray and captured nut assembly.
Figure 4:
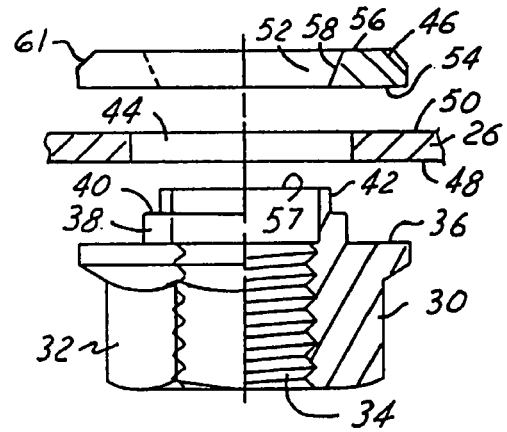
FIG. 4 is an exploded view of the parts shown in FIG. 2.
Figure 5:
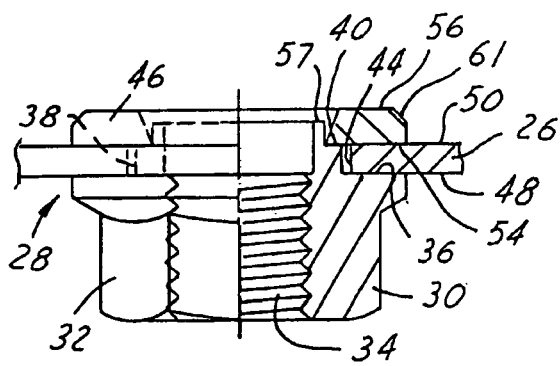
FIG. 5 is a view similar to FIG. 3 before the collar is swaged to permanently connect the nut, windage tray and washer together.

The fastener assembly 28 is more clearly shown in FIGS. 3, 4, and 5. Each fastener assembly 28 includes an internally threaded fastener 30 having a hex shaped drive section 32. The fastener 30 is commonly referred to as a captured nut. The captured nut 30 has a threaded internal aperture 34. The captured nut 30 has a bearing surface 36 and an annular step 38 surrounding the aperture 34. The end of the step 38 has a second bearing surface 40 and an axially extending collar 42.

As shown in FIGS. 4 and 5, the step 38 is received in the mounting aperture 44 in windage tray 26. The thickness of the windage tray 26 about the aperture 44 is less than the height of the step 38 from bearing surface 36 to bearing surface 40. The drive section 32 has its first bearing surface 36 seated against one side 48 of the windage tray 26.

A washer 46 is also placed against an opposite side 50 of the windage tray 26 and rests on second bearing surface 40. The captured nut 30 has its collar 42 received in a central aperture 52 of washer 46. The thickness of the washer 46 between its proximate face 54 which rests on second bearing surface 40 and it distal face 56 is greater than the height of collar 42 from the second bearing surface 40 to its distal end 57. The relative dimensions are clearly shown in the partially assembled view in FIG. 5.

The aperture 52 is surrounded by a tapered interior wall 58 which is tapered approximately 70° from the proximate face 54. The exterior edge 61 of distal face 56 is beveled to provide for automatic positioning and indexing of the washers when being assembled onto the captured nut 30.

The captured nut 30 then has its collar 42 swaged outwardly to retain the washer against the second bearing surface 40 as shown in FIG. 2 by abuting tapered wall 58.

The captured nut 30 and washer 46 are free to rotate with respect to the windage tray because of the space between the bearing surface 36 and washer 46 do not crimp or clamp upon or press fit against the windage tray 26.

The formed fastener assembly 28 with the captured nut 30 and washer 46 are then rotated onto the stud 20 during installation of the windage tray 26 in place on the engine 10. Upon installation, the captured nut 30 and washer 46 clamp upon the windage tray 26.

Figure 6:
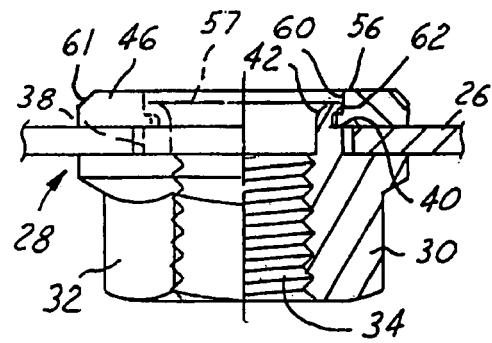
FIG. 6 is a view similar to FIG. 3 illustrating an alternative embodiment.

Another embodiment is shown in FIG. 6 where the central aperture 52 of washer 46 is surrounded by a stepped wall 60 of washer which presents a ledge 62 which faces the distal face 56 of the washer 46. The collar 42 of the captured nut 30 is crimped over the ledge 62 to be positioned within the washer aperture 52 and retains the washer against the second bearing surface 40.

Figure 7:
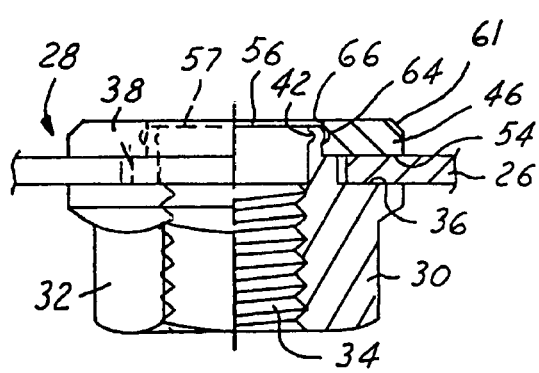
FIG. 7 is a view similar to FIG. 3 illustrating a third embodiment.

A third embodiment is shown in FIG. 7 where a groove 64 is formed in an interior wall 66 about the aperture 52. The collar 42 is deformed radially outwardly to intrude into the groove 64 as shown to retain the washer 46 against the second bearing surface 40.

In all three embodiments, the collar 42 is retained within the axial confines of the aperture 52 within the washer 46. As such the distal face 56 of washer 46 provides a smooth regular shaped clamping surface free from any protrusion of the nut to help obtain and retain an accurate clamping load as the windage tray is tightened in place under the engine 10.

Preferably in all three embodiments, the washer is made from a steel or other material suitable for clamping a windage tray against the engine. Material properties shall be suitable so that no clamping loads are exerted onto the crimped or swaged collar 42 of the nut 30.

Of course it is foreseen that the captured nut 30 and washer 46 can be mounted onto a myriad of other work-pieces other than a windage tray when desired.

Other variations and modifications are possible without departing from the scope and spirit of the present invention as defined by the appended claims.

What is claimed is:

1. A captured nut and work-piece assembly comprising,:
   an internally threaded fastener having a drive section, a first bearing surface, a work-piece receiving step extending from said first bearing surface, a second bearing surface at the end of said step and an axially extending collar extending from said second bearing surface and being coaxial with said step;
   a work-piece having an aperture to receive said step and seat against said first bearing surface, said fastener having its drive section on one side of the work-piece and the collar extending to the opposing side of the work-piece, said work-piece about said aperture having a thickness less than the height of said step;
   a washer having an aperture therethrough for receiving the collar, said washer having a proximate face seating said second bearing surface, said washer having a thickness greater than the height of said collar;
   said washer having an interior facing wall about its aperture that has a radially extending section that is captured by said collar as it is deformed outwardly with said proximate face seated on said second bearing surface.

2. A captured nut and work-piece assembly as defined in claim 1 further comprising:
   said interior facing wall being tapered radially outwardly from said proximate face to said distal face; and
   said collar being swaged at an angle to abut against said tapered interior facing wall.

3. A captured nut and work-piece assembly as defined in claim 2 further comprising:
   said interior facing wall being angled approximately 70° from the proximate face of the washer.

4. A captured nut and work-piece assembly as defined in claim 1 further comprising:
   said interior facing wall having a radially extending ledge section interposed between the proximate and distal faces of the washer and facing toward said distal face;

said collar being crimped over said ledge within said aperture and its axial confines to retain said washer.

5. A captured nut and work-piece assembly as defined in claim 1 further comprising:

said interior facing wall having a circumferential groove therein; and said collar being deformed to intrude into said groove and retain said washer.

6. A windage tray assembly for an internal combustion engine comprising:

a plurality of internally threaded fasteners each having a drive section, a first bearing surface, a windage tray receiving step extending from said first bearing surface, a second bearing surface at the end of said step and a washer receiving collar extending from said second bearing surface and being coaxial with said step;

a windage tray having a plurality of apertures to receive said respective step and abut against said first bearing surface, said fastener having its drive section on one side of the windage tray and the collar on the opposing side of the windage tray, said windage tray about said aperture having a thickness less than the height of said step;

a washer having an aperture therethrough for receiving the collar, said washer having a proximate face abutting against said second bearing surface, said washer having a thickness greater than the height of the collar;

said washer having an interior facing wall about said aperture that has a radially extending section that is captured by said collar as it is deformed outwardly with said proximate face being seated on said second bearing surface.

7. A windage tray assembly as defined in claim 6 further comprising:

said interior facing wall being tapered radially outwardly from said proximate face to said distal face; and said collar swaged at an angle to abut against said tapered interior facing wall.

8. A windage tray assembly as defined in claim 7 further comprising:

said interior facing wall being angled approximately 70° from the proximate face of the washer.

9. A windage tray assembly as defined in claim 6 further comprising:

said interior facing wall having a radially extending ledge section interposed between the proximate and distal faces of the washer and facing toward said distal face;

said collar being crimped over said ledge within said aperture and its axial confines to retain said washer.

10. A windage tray assembly as defined in claim 6 further comprising:

said interior facing wall having a circumferential groove therein; and said collar being deformed to intrude into said groove and retain said washer.

* * * * *